UNITED STATES PATENT OFFICE.

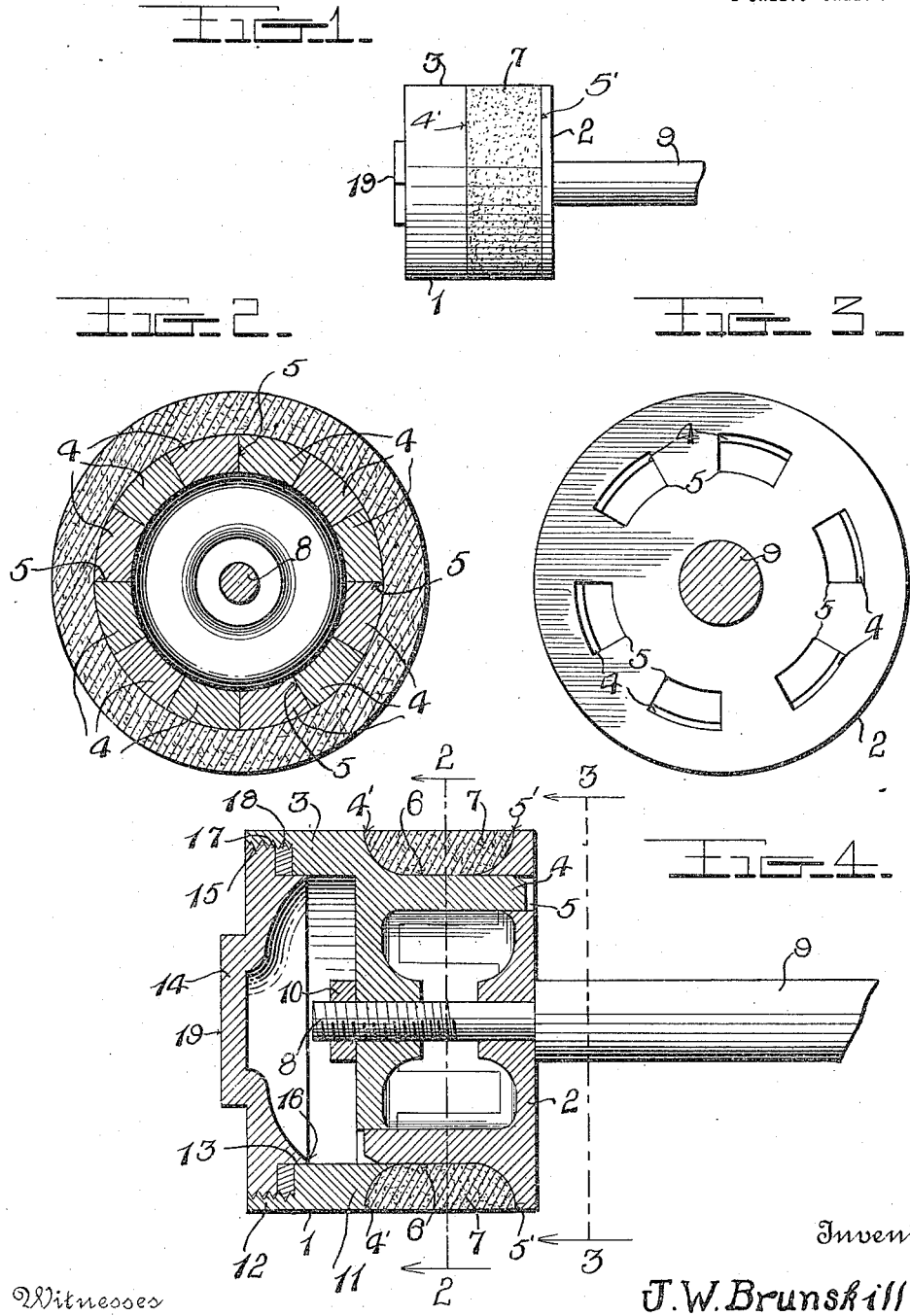

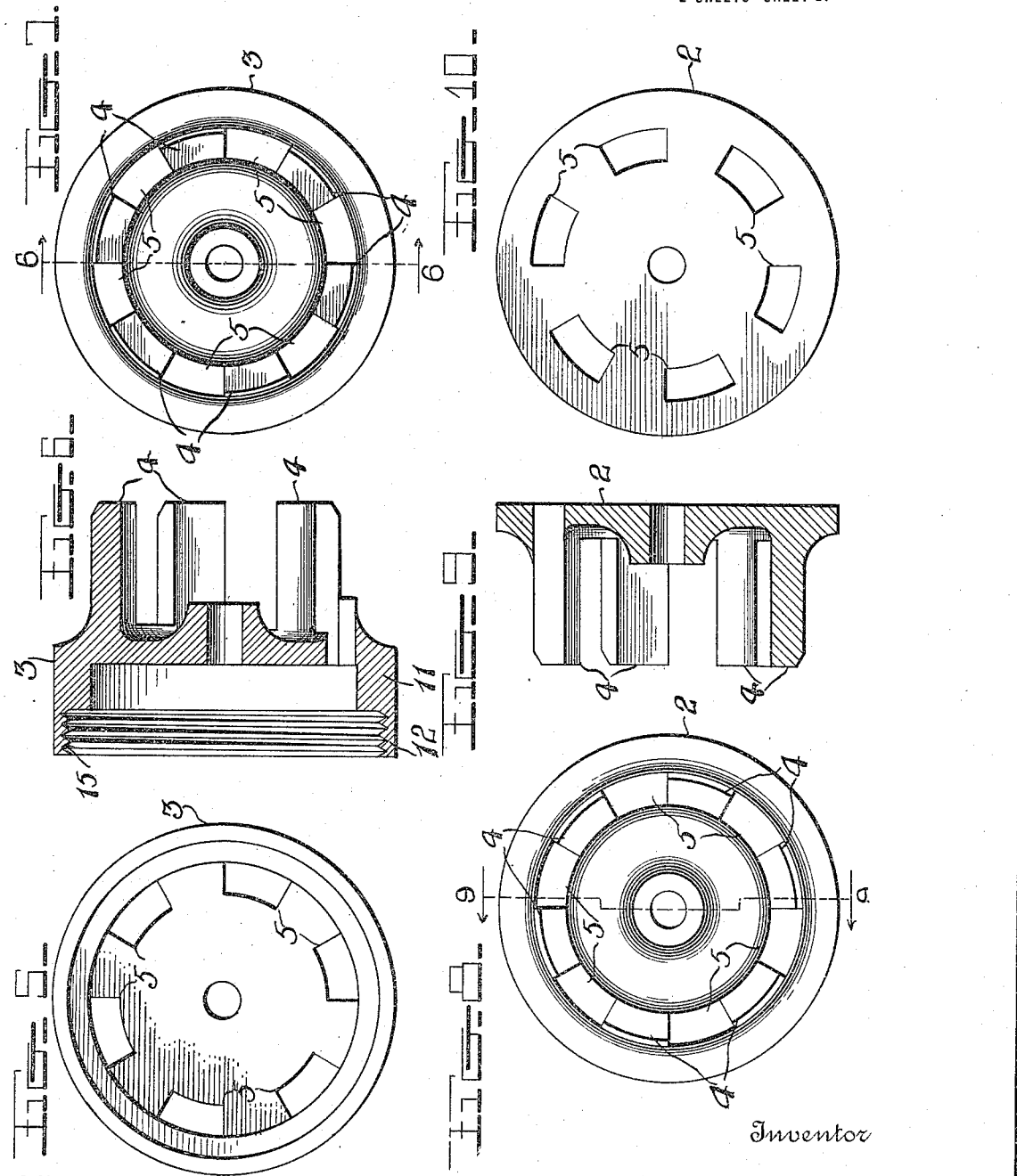

JAMES W. BRUNSKILL, OF DUBUQUE, IOWA.

PISTON.

1,177,010.  Specification of Letters Patent.  Patented Mar. 28, 1916.

Application filed May 3, 1915. Serial No. 25,541.

*To all whom it may concern:*

Be it known that I, JAMES W. BRUNSKILL, a citizen of the United States, residing at Dubuque, in the county of Dubuque and State of Iowa, have invented certain new and useful Improvements in Pistons; and I do declare the following to be a full, clear, and exact description of the invention, such as will enable others skilled in the art to which it appertains to make and use the same.

This invention relates to pistons generally and may be embodied in a piston to which power is applied and which in turn exerts its pressure upon a fluid, as in a pump or compressor, or it may be embodied in a piston upon which a fluid under pressure exerts its pressure and which in turn exerts its pressure upon some other part, as in an engine or other machine. I therefore desire to have it understood that the invention is not limited to the character of the machine on which the piston is used but that on the contrary it is concerned only with the construction of the piston itself.

The primary object of the invention is to provide a piston or plunger of this character so constructed that no air or other fluid can possibly pass between the walls of the cylinder and the periphery of the piston.

Another object is to provide a sectional piston, the parts of which are constructed for interlocking engagement so that one cannot turn without the other, thus preventing the packing from getting out of place and which are provided with an auxiliary device for preventing leakage of fluid through the interlocking members of the piston.

With these and other objects in view, the invention consists of certain novel features of construction, and the combination and arrangement of parts as will be more fully described and claimed.

In the accompanying drawings: Figure 1 represents a side elevation of a piston constructed in accordance with this invention; Fig. 2 is a transverse section taken on the line 2—2 of Fig. 4; Fig. 3 is a similar view taken on the line 3—3 of Fig. 4; Fig. 4 is a longitudinal central section thereof; Fig. 5 is a bottom plan view of one of the members comprising this piston. Fig. 6 is a transverse section taken on the line 6—6 of Fig. 7; Fig. 7 is a top plan view of the same member; Fig. 8 is a similar view of the other member of the piston; Fig. 9 is a transverse section taken on the line 9—9 of Fig. 8, and Fig. 10 is a bottom plan view of said member.

In the embodiment illustrated a piston 1 is shown composed of two head sections 2 and 3 constructed in the form shown in Fig. 4 and provided with interlocking fingers 4 adapted to engage sockets 5 of the other member so that when the parts are assembled these fingers and sockets will telescopically engage and thus reliably hold the parts of the piston against turning relatively to each other. These piston members or heads 2 and 3 are provided in their periphery with packing seats 4' and 5', the seat of one member registering with that of the other to form when assembled a semicircular recess to receive a packing ring 7 which is of the same cross sectional contour as the seat 6 which is designed to receive it. This packing 7 may be of any suitable or desired construction and is held in the seat 6 by the clamping together of the two members 2 and 3 which is accomplished by means of a threaded extension 8 formed on the inner end of a rod 9, said extension 8 being passed centrally through the body portions of the members 2 and 3 and projecting beyond the outer face of the member 3 where it is secured by means of a hexagonal nut 10 threaded on said rod as is shown clearly in Fig. 4 and which when screwed up draws the two members 2 and 3 toward each other and thereby reliably clamps the packing 7 in its seat 6, compressing said packing and causing it to move outwardly into engagement with the cylinder in which the piston is mounted.

The member 3 has a longitudinally extending flange 11 arranged in alinement with the peripheral portion thereof and which is provided at its outer end with a reduced portion 12 which latter is internally threaded and terminates at its base in a shoulder 13 for a purpose to be described. A closure for this end of the member 3 is shown in the form of a casting 14 having a peripherally threaded flange 15, the diameter corresponding to the internal diameter of the reduced portion 12 of the flange 11 and which is adapted to be threaded into engagement therewith. This member 14 is provided at the base of said flange with an inwardly extending shoulder 16 which is arranged in alinement with the inner face of the flange 11 and is designed to overlap said flange as is shown clearly in Fig. 4, forming between the shoulder 13 of said flange 11 and the inner face of the flange 15 a packing seat 17 in which a gasket 18 is mounted and clamped to prevent all possibility of any fluid which might enter between the interlocking elements of the members 2 and 3 from passing out beyond the piston. This closure is provided on its outer face with a hexagonal nut-like projection 19 to receive a wrench for screwing and unscrewing said closure when assembling and disassembling the parts of the piston.

From the above description, it will be obvious that when the parts are assembled as described and the piston mounted in a cylinder which it is adapted to fit no fluid can possibly pass between the periphery of said piston and the side walls of the cylinder, and should the packing become worn it may be adjusted to cause it to tightly engage the cylinder by forcing the members 2 and 3 together by screwing up the nut 10 on the rod 9 and thus reducing the width of said packing and consequently increasing its thickness, forcing it into engagement with the cylinder walls to produce a fluid tight connection.

I claim as my invention:

1. A piston comprising two members having interlocking elements and each provided at its periphery with a packing seat, the seat in one member adapted to register with that in the other when the members are assembled, and means for securing said members together and adjusting them in relation to each other.

2. A piston comprising two members having interlocking elements and each provided at its periphery with a packing seat, the seat in one member adapted to register with that in the other when the members are assembled, means for securing said members together in relation to each other, one of said members having an annular flange at its outer end extending in longitudinal alinement with said member, said flange being reduced in thickness at its outer end and internally threaded, a shoulder formed at the base of said reduced flanged portion, and an end closure for said flange threaded into said threaded flanged portion, and a packing arranged between said shoulder and closure.

3. A piston comprising two members having telescopically engaging elements and each having a packing seat in the periphery thereof, said seats being curved at their outer ends with the seat of one member registering with that of the other, means for adjusting said members toward and away from each other, packings arranged in said seats and conforming to the cross sectional contour thereof, and a closure mounted in the outer end of one of said members and having a fluid-tight engagement therewith.

In testimony whereof I have hereunto set my hand in presence of two subscribing witnesses.

JAMES W. BRUNSKILL.

Witnesses:
T. J. PAISLEY,
CHAS. McMANUS.

Copies of this patent may be obtained for five cents each, by addressing the "Commissioner of Patents, Washington, D. C."